United States Patent
Shi et al.

(10) Patent No.: US 8,014,748 B2
(45) Date of Patent: Sep. 6, 2011

(54) COMMUNICATION SYSTEM HAVING A COMMUNICATION DEVICE

(75) Inventors: Xiaolei Shi, Munich (DE); Guido Stromberg, Munich (DE)

(73) Assignee: Infineon Technologies AG, Neubiberg (DE)

( * ) Notice: Subject to any disclaimer, the term of this patent is extended or adjusted under 35 U.S.C. 154(b) by 443 days.

(21) Appl. No.: 11/577,285

(22) PCT Filed: Oct. 17, 2005

(86) PCT No.: PCT/DE2005/001846
§ 371 (c)(1),
(2), (4) Date: Feb. 9, 2009

(87) PCT Pub. No.: WO2006/039920
PCT Pub. Date: Apr. 20, 2006

(65) Prior Publication Data
US 2009/0140876 A1    Jun. 4, 2009

(30) Foreign Application Priority Data
Oct. 15, 2004   (DE) .................. 10 2004 050 393

(51) Int. Cl.
H01Q 11/12   (2006.01)
H04B 1/16    (2006.01)
H04B 1/38    (2006.01)

(52) U.S. Cl. .............. 455/343.1; 455/127.5; 455/343.4; 455/574; 370/311; 340/7.32; 340/10.33

(58) Field of Classification Search .......... 455/127.5, 455/343.2–343.4, 574; 340/7.32–7.38, 10.33–10.34; 370/311
See application file for complete search history.

(56) References Cited

U.S. PATENT DOCUMENTS

| 5,918,170 | A  |   | 6/1999  | Oksanen et al. |
|-----------|----|---|---------|----------------|
| 5,940,771 | A  | * | 8/1999  | Gollnick et al. ............. 455/517 |
| 6,615,033 | B1 | * | 9/2003  | Cragun ......................... 455/502 |
| 6,639,907 | B2 | * | 10/2003 | Neufeld et al. ............... 370/342 |
| 7,245,946 | B2 | * | 7/2007  | Liu ............................... 455/574 |
| 7,251,508 | B2 | * | 7/2007  | Pattabiraman et al. ...... 455/574 |
| 7,400,595 | B2 | * | 7/2008  | Callaway et al. ............. 370/311 |
| 7,457,973 | B2 | * | 11/2008 | Liu ............................... 713/310 |

(Continued)

FOREIGN PATENT DOCUMENTS

DE       10136757 C1    4/2003

(Continued)

OTHER PUBLICATIONS

A. El-Hoiydi, "Aloha with Preamble Sampling for Sporadic Traffic in Ad Hoc Wirelss Sensor Networks", CSEM, 2002.

(Continued)

*Primary Examiner* — Simon D Nguyen
(74) *Attorney, Agent, or Firm* — Dicke, Billig & Czaja, PLLC

(57) ABSTRACT

A communication system is enclosed. In one embodiment, the communication system includes a communication device configured to puts itself into an activated state or into a deactivated state at alternate times. The communication device receives time information in a first operating state of the activated state, takes the received time information as a basis for ascertaining the later time at which useful information is transmitted to the communication device, receives the useful information at the later time in a second operating state of the activated state, and with individual components of the communication device being able to be put into an activated state or into a deactivated state independently of one another.

25 Claims, 3 Drawing Sheets

U.S. PATENT DOCUMENTS

| | | | |
|---|---|---|---|
| 7,460,543 B2 * | 12/2008 | Malik et al. | 370/395.4 |
| 7,477,616 B2 * | 1/2009 | Wang et al. | 370/311 |
| 7,508,781 B2 * | 3/2009 | Liu et al. | 370/311 |
| 7,693,117 B2 * | 4/2010 | Benveniste | 370/338 |
| 7,801,065 B2 * | 9/2010 | Simpson et al. | 370/311 |
| 2001/0041551 A1 | 11/2001 | Rotzoll | |
| 2003/0008692 A1 * | 1/2003 | Phelan | 455/574 |
| 2004/0014505 A1 | 1/2004 | Rainish et al. | |
| 2004/0190467 A1 | 9/2004 | Liu et al. | |
| 2004/0253996 A1 * | 12/2004 | Chen et al. | 455/574 |
| 2004/0264397 A1 * | 12/2004 | Benveniste | 370/311 |
| 2005/0018624 A1 * | 1/2005 | Meier et al. | 370/318 |
| 2005/0096101 A1 * | 5/2005 | Sayers | 455/574 |
| 2005/0124313 A1 * | 6/2005 | Simpson et al. | 455/343.3 |
| 2005/0233704 A1 * | 10/2005 | Maekawa | 455/69 |
| 2009/0213830 A1 * | 8/2009 | Duesberg et al. | 370/345 |

FOREIGN PATENT DOCUMENTS

| | | |
|---|---|---|
| DE | 10213114 A1 | 10/2003 |
| WO | 0133721 A2 | 5/2001 |
| WO | 2004030251 A1 | 4/2004 |

OTHER PUBLICATIONS

A. El-Hoiydi et al., "Poster Abstract: WiseMAC, an Ultra Low Power MAC Protocol for the WiseNET Wirelss Sensor Network", CSEM SA, Nov. 2003.

Infineon Wirelss Solutions. ASK/FSK 434 MHz Wirelss Transceiver TDA 5255 E1.

"IEEE Standard for Information Technology—Telecommunications and information exchange between systems—Local and metropolitan area networks-Specific requirements", IEEE, Oct. 1, 2003.

* cited by examiner

COMMUNICATION SYSTEM HAVING A COMMUNICATION DEVICE

CROSS REFERENCE TO RELATED APPLICATION

This Utility Patent Application claims the benefit of the filing date of German Application No. DE 10 2004 050 393.1, filed Oct. 15, 2004, and International Application No. PCT/DE2005/001846, filed Oct. 17, 2005, both of which are herein incorporated by reference.

BACKGROUND

The invention relates to a communication device, a control device and a communication system.

In a ubiquitous computer scenario, such as a "Smart House" (that is to say a house with intelligent control of individual domestic appliances), there are frequently some appliances with high computation power and a large memory space, such as a desktop computer, a laptop or a PDA (Personal Digital Assistant). Such appliances are subsequently also referred to as terminals. Terminals can be used to monitor and control small devices which have been integrated into this computer environment, such as thermometers, pressure sensors or switches.

In the scenario under consideration, these small sensors or actuator devices can be coupled to the terminals so as to be able to communicate, by connecting wireless radio frequency transceivers to the sensors or actuator devices (for example an active RFID tag (Radio Frequency IDentification tag). Such sensors and actuators which have a radio frequency transceiver or can be fitted to a radio frequency transceiver are subsequently also referred to as transceivers. Normally, a terminal is either operated using an electrical power line (as in the case of a desktop computer, for example) or it can be provided so as to be rechargeable (as in the case of a laptop or PDA, for example). This means that the admissible power requirement for such terminals is typically not seriously limited. In other words, the power supply for terminals is uncritical in many cases.

By contrast, transceivers are usually powered by small batteries, and it is inconvenient for a user to replace such batteries frequently. This is because of the large number of such transceivers in a "Smart House", inter alia. Power consumption is therefore one of the critical technical factors when developing transceivers. In a transceiver apparatus, the radio frequency transceiver is one of the greatest consumers of power.

In addition, methods known from the prior art are described which a control unit (such as a laptop computer) can use to access communication devices, such as RF transceivers, or which can be used for communication.

Without a specific access scheme, most RF transceivers need to be kept continuously in a reception mode and are therefore continually awaiting possible arrival of a packet of data from the terminal. This continual operation of an RF transceiver in an activated state is extremely inefficient as regards the power consumption of the transceiver, since the power consumption of an RF transceiver in a reception mode is very high, which means that a battery can be drained within a few days.

The prior art includes known methods which can be used to reduce the power consumption in comparison with continual activated operation of an RF transceiver.

One known solution is "Media Access Control (MAC) Layer Duty Cycle Scheduling". The "IEEE802.15.4 Low-Rate Wireless Personal Area network" Standard described in LAN/MAN Standards Committee of the IEEE Computer Society. IEEE Standard for Information Technology, Part 15.4: Wireless Medium Access Control (MAC) and Physical Layer (PHY) Specifications for Low-Rate Wireless Personal Area Networks (LR-WPANs), October 2003, is one example of this. In a master-slave star topology network, the master (for example a terminal) periodically transmits a signal frame (beacon). The beacon contains synchronization information and indicates the slave nodes (for example transceiver) with which the master which is to communicate in a particular period. The slaves awake periodically to detect a beacon. If there are pending packets available for a particular slave, which is indicated in a beacon, or if a slave has packets for the master then the slave can remain activated ("awake") for the rest of the period of communication. If there is no packet, the slave changes to a power-saving sleep mode until the next beacon is transmitted by the master. In this way, the slave awakes its MAC module and its RF transceiver in each period for the length of a beacon. If the ratio of beacon length to period, defined as the "duty cycle", is very low (for example 1%), the power requirement for the slave RF transceiver falls by a factor of one hundred under the constraint that no useful data are transmitted. However, the drawback of this mechanism is that only a star topology with a master supports this scheme, since a plurality of masters produce a plurality of beacons, which would confuse a slave which detects all the beacons. Another drawback of this method is that both the MAC module and the RF transceiver need to be awoken in order to receive and forward the beacon, specifically regardless of the presence of transmitted useful data.

Another known method is to design a wakeup-by-signal RF transceiver. This means that when a terminal with a sleeping transceiver wishes to communicate, it emits a specific wakeup signal which can wake up the sleeping transceiver. In this way, a transceiver is awoken only upon request instead of being awoken periodically, so that the power consumption can be reduced in comparison with the method in which the sleeping transceiver is awoken periodically. This method is also not limited to one particular network topology.

Ideally, the transceiver remains passive for detecting the wakeup signal. However, a fully passive RF transceiver can be produced only with a high level of design complexity, and to date there is no mass-produced product which satisfies this functionality.

In addition, the "Preamble Sampling" scheme disclosed in El-Hoiydi, A "Aloha with Preamble Sampling for Sporadic Traffic in Ad Hoc Wireless Sensor Networks", CSEM, 2002 has been proposed which combines the two previously described methods with one another. On the basis of this scheme, each RF transceiver awakes itself for a short time, during which the RF transceiver takes a Received Signal Strength Indicator (RSSI) as a basis for detecting whether the channel is in use. If the channel is in use, the RF transceiver awakes other components of the apparatus so as to detect the signal on the channel. Otherwise, it remains in a sleeping state. This detection method can be referred to as "scanning". To send a packet to such an RF transceiver, that is to say to scan the channel, a terminal must first of all transmit a WakeUp Preamble (WUP) with a length which is greater than the scanning period, so that it is certain that the scanning RF transceiver can detect the preamble and can waken the components of its apparatus to receive the packet which comes after the preamble. This scheme is referred to as a WUP scheme. The WUP scheme is not a genuine wakeup-by-signal scheme, since the RF transceiver still has a period which it uses to awake itself. However, the time required for scanning is greatly shortened in comparison with that for monitoring a signal frame in line with the IEEE802.15.4 standard. In addition, the scanning by using RSSI can be performed by the RF transceiver alone without the aid of other modules. Another advantage is that the WUP scheme can be used in any desired topology, such as a star mesh topology with a plurality of masters (terminals) or in a peer-to-peer topology without a master.

One drawback of the WUP scheme is its low efficiency with regard to the maximum attainable data throughput, on account of the transmission of long preambles. The length of the preamble is dependent on the scanning period, which is frequently in the order of magnitude of several 100 ms. However, a packet length in a wireless sensor network is normally fairly short and requires only a few 10 ms for transmission. Consequently, preambles produce a large part of the traffic on this channel, which drastically reduces the maximum attainable data throughput for actual useful packets. This is the reason why the WUP scheme is suitable only for networks with sporadic traffic in which the maximum attainable data throughput is not a critical factor. Another drawback of the WUP scheme is the additionally required power which is consumed by sending long WUPs.

Therefore, what is known as a WiseMAC protocol has been proposed which is based on the WUP scheme and in which the length of the WUP is shortened, see El-Hoiydi, A et al. "Poster Abstract: WiseMAC, an Ultra Low Power MAC Protocol for the WiseNET Wireless Sensor Network", CSEM SA, November 2003. On the basis of this protocol, each apparatus stores the scanning schemes from its neighbors, which are attached in "piggyback" form to the last received packet from the neighbor. This allows a short WUP to be used in order to waken a neighbor on the basis of the stored scheme. However, inaccuracies in the clock signals in the apparatuses cause a time drift to arise between the apparatuses, so that the length of the preamble needs to be extended in order to compensate for the time drift if the wakeup scheme of the destination nodes has already been received a considerable time ago.

The WiseMAC protocol allows the use of a much shorter preamble, which firstly increases channel capacity and secondly saves power which is required for sending a long WUP.

The WiseMAC protocol therefore allows a shorter preamble to be used in comparison with the conventional long WUP. However, the long WUPs are still needed in many cases. Firstly, the very first packets between the neighbors should be sent using a long WUP. Secondly, the compensation for the time drift can make a short WUP much longer, so that the length can be increased up to the length of the scanning period. In addition, what is known as a broadcast needs to use a long WUP in order to waken all the neighbors. Apart from the broadcast/multicast traffic in the topmost layer, broadcasts exist in widespread form in a network with mobile devices during network discovery, handshaking, multihop routing etc. A large quantity of long WUPs is therefore unavoidable, which wastes power and channel capacity.

The text below refers to FIG. 1 and FIG. 2 to describe a WakeUp Preamble scheme 100 based on the prior art.

FIG. 1 illustrates a transmitter scheme 110, that is to say a time sequence of states as adopted by a transmitter. In addition, a receiver scheme 120 is illustrated, that is to say a time sequence of signals as adopted for RF scanning by a reception device. In addition, an FPGA scheme 130 is illustrated, that is to say the time sequence for the operating state of an FPGA (Field Programmable Gate Array, a programmable logic circuit, that is to say a structure including configurable logic chips, each of which can be used, by way of example, as AND, OR, NOT, XOR, etc.). In addition, a microcontroller scheme 140 illustrates the time sequence for the operating states of a microcontroller.

The reception device, the FPGA and the microcontroller are coupled to one another and form a communication device (for example an active RFID tag) which is provided so as to be able to communicate with a control unit (for example a reader).

As can be seen from the transmitter scheme 110, the transmitter sends a data frame 112 after it has sent a long WUP 111 (WakeUp Preamble). As can be seen from the receiver scheme 120, the RF receiver is alternately in a deactivated state 121 or in an activated state 122. The activated state 122 contains an RF setup state 123, in which the receiver is prepared for an activated state, and a DRD state 124 (data rate detection), in which the receiver is ready to receive. In this reception state, the transceiver evaluates the received signal, e.g., using the RSSI and/or the incoming data rate, with the aim of detecting the WUP. If the receiver is in an activated state 122 during transmission of the WUP 111, the RF transceiver detects this preamble 111 and uses a wakeup command 150 to waken the FPGA, previously in a power-saving state. This changes the FPGA from a deactivated state 131 to an activated state 132, the FPGA briefly adopting an FPGA setup state 133 between the deactivated state 131 and the activated state 132. The FPGA then switches the RF transceiver from a self-polling mode (that is to say a mode in which the transceiver switches itself to and fro between an activated state 122 and a deactivated state 121) to a reception mode for receiving the data frame 112. This is done by a wakeup command 151. After such a wakeup command 151, the RF transceiver changes from the deactivated state 121 via an RF setup state 123 to the reception mode 125. The microcontroller is then woken up in order to process the frame. For this, the microcontroller is transferred from a deactivated state 141 to an activated state 142, specifically by a wakeup command 152 from the FPGA. Between the deactivated state 141 and the activated state 142, the microcontroller briefly adopts a microcontroller setup state 143.

The RF transceiver, the FPGA and the microcontroller have a respective setup delay 123, 133 or 143. The length of the WUP 111 is calculated such that it is sufficient even for a worst case scenario in which the start of the WUP 111 just misses a DRD interval 124. In addition, the setup delays 123, 133, 143 of the components need to be taken into account.

The WUP scheme 100 based on the prior art has the drawback that if the RF transceiver detects a valid data rate at the start of the WUP 111 then it wakens the FPGA and the FPGA controls the RF transceiver such that it changes to the reception mode. The RF transceiver and the FPGA have to wait a relatively long time before they receive the data frame 112, as illustrated in the dashed loss area 201 in FIG. 2. Since this waiting time is on average approximately half of the scanning period, which may be in the region of several 100 ms, a large quantity of electrical power is consumed by the RF transceiver and by the FPGA in the loss area 201. This means that the methods known from the prior art for communication between a communication device and a control device are not suitable to be operated with a sufficient low power requirement.

DE 102 13 114 A1 discloses a method for the periodic radio transmission of measurement data from a plurality of measurement devices on a common receiver. To reduce the current drawn in the receiver, it is proposed that the receiver be put into reception standby only in a time window when transmission of the measurement data from a particular measurement device is expected.

DE 101 36 757 C1 describes a method for operating a radio system in which receivers are respectively allocated a characteristic of a radio signal and a receiver is changed from a standby mode to an operating mode when it receives a radio signal which has the characteristic which is associated with it. The characteristic is a particular data rate for the radio signal, for example.

DE 199 52 840 A1 describes the transmission of digital data through the transmission of data packets from a transmitter to one or more receivers, the transmitter sending waiting packets from which the receivers can determine a waiting time up until the transmission of data packets. For the duration of the waiting time, the receivers deactivate their reception device.

U.S. Pat. No. 5,918,170 describes a method for operating a mobile radio communication network with a set of mobile radio terminals. A control channel is repeatedly used to send a frame structure, and the mobile radio terminals are controlled such that they leave a sleep mode at particular intervals of time and receive the frame structure at regular intervals.

WO 2004/030251 A1 discloses a communication system in which a message which has a message portion indicating the time for the transmission of a later signal is sent from a transmitter to a receiver.

For these and other reasons, there is a need for the present invention.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION

Figure 1:
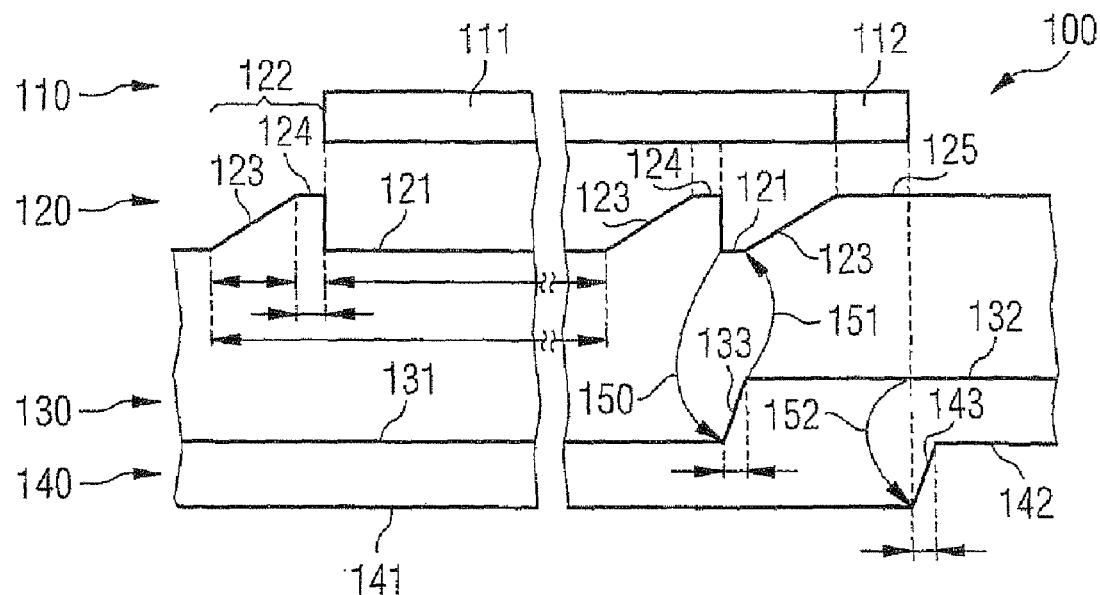
FIG. 1 illustrates a WakeUp Preamble scheme based on the prior art.
Figure 2:
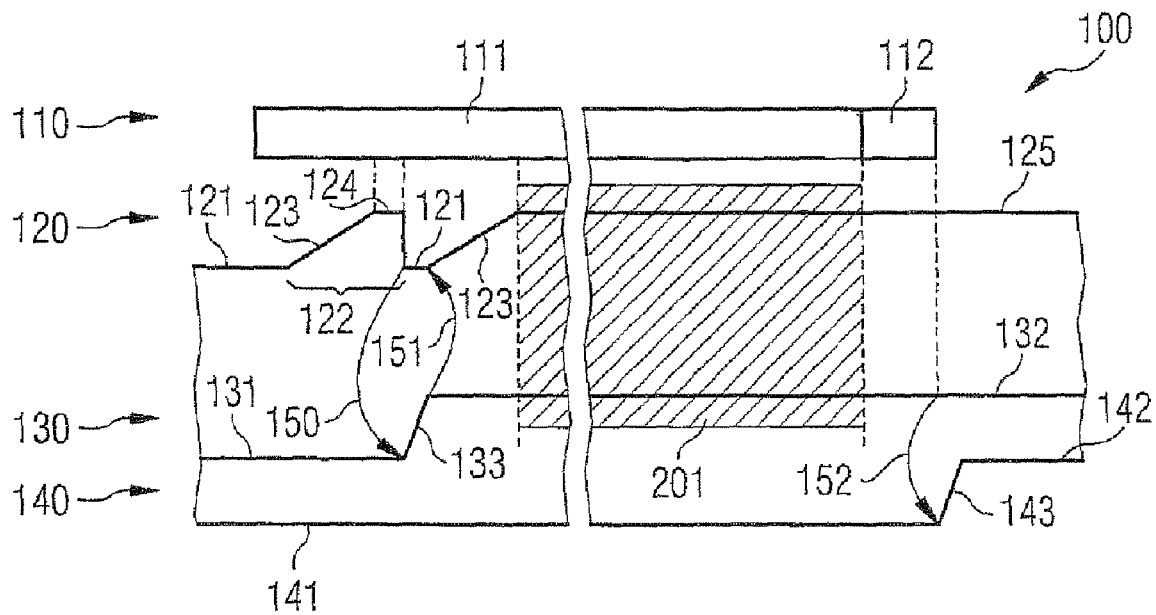
FIG. 2 illustrates another illustration of the WakeUp Preamble scheme based on the prior art from FIG. 1.

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the present invention provide a communication scheme between a communication device and a control device which communication scheme allows communication with a reduced power requirement. Embodiments include a communication device, a control device and a communication system.

The inventive communication device is set up such that it can execute processes in which the communication device puts itself into an activated state or in a deactivated state at alternate times. In addition, the communication device receives time information in a first operating state of the activated state. The communication device takes the received time information as a basis for ascertaining the later time at which useful information is transmitted to the communication device. In addition, the communication device receives the useful information at the later time in a second operating state of the activated state.

Furthermore, the invention provides a control device for controlling a communication device which is set up such that it transmits time information and useful information to a communication device at alternate times, the time information being able to be taken as a basis for ascertaining the later time at which useful information will be transmitted.

In addition, the invention provides a communication system having at least one communication device having the features described above and having a control device having the features described above for communication with the at least one communication device.

During communication between a communication device and a control device the control device transmits the information regarding the later time at which useful information will be transmitted. The communication device itself checks from time to time whether a control device is transmitting signals. For this, the communication device is intermittently put into an activated state, and the rest of the time it remains in a power-saving deactivated state. In the activated state, the communication device can receive time information on the basis of which it can ascertain the later time at which useful information will be transmitted. The communication device can then remain in a deactivated state until the time interval for transmitting useful information has elapsed. In other words, on the basis of the ascertained residual time period up until transmission of the useful information, the communication device can be in a power-saving mode, since the communication device can organize the remaining residual time such that a power-consuming (activated) operating state is limited to those intervals of time in which the activated state is essential, namely the time interval for transmitting the useful information. In other intervals of time, needlessly wasted power is otherwise saved by virtue of at least part of the communication device being able to be put into a deactivated state for at least some of the remaining time. Using the information regarding the time at which relevant useful information will be transmitted next, the communication device can change back to the activated state in good time and detect the useful information.

Particularly for interaction with such a communication device, the inventive control device is provided and set up such that before useful information is transmitted it transmits time information to the communication device which contains the encoded information regarding the later time at which useful information is transmitted.

Power-saving embodiments of the invention can be seen in the pulsed operation of the communication device between the activated state and the deactivated state and in the fact that the communication device can be put back into an activated state in good time when useful information to be detected is transmitted.

Hence, a low-power "MAC-layer Wakeup Frame" scheme is clearly provided, particularly for wireless networks. In other words, the invention introduces a communication scheme which can be used to reduce the power requirement for an RF transceiver in a communication device and which therefore allows a large number of apparatuses to be embedded in a ubiquitous computer environment. The invention can be implemented within the context of a star topology or a star mesh topology as a network topology with terminals as central nodes for the stars. In such a network, it can frequently be assumed that the power requirement of the terminals is uncritical, whereas the power requirement of individual communication devices is critical, but in line with the invention can be implemented with a very low power requirement.

Clearly, the invention allows the WUP scheme to be optimized such that a still lower power requirement is achieved. The invention uses a WakeUp Frame (WUF) instead of a WakeUp Preamble (WUP) in order to significantly reduce the power consumption which arises as a result of a long WUP.

The invention's WUF scheme can be implemented on the basis of a standard product from Infineon, namely the RF transceiver TDA 525x as communication device. A TDA RF transceiver of this kind has a "data rate detection" function (DRD), which can detect a signal at a particular data rate, in the transmission time of 3 bits, and which can produce an output pulse which can be used to waken other hardware modules, such as an FPGA. In addition, such a TDA has what is known as a self-polling mode, in which it can switch itself periodically to and fro between a sleep state and a DRD state (that is to say an activated state) without the aid of other components. In the DRD mode, it is possible to detect either a simple WakeUp Preamble (that is to say an alternating signal sequence at a particular data rate) or Manchester-encoded data signals. The latter is used to transmit the information in the WakeUp Frame.

The text which follows describes embodiments of the communication device. These embodiments also apply to the control device and to the communication system.

The communication device may be set up such that it puts itself into an activated state or into a deactivated state periodically. This means that the communication device can switch itself at periodic times to and fro between two operating states, namely in an activated power-consuming state which is as short as possible and in a deactivated power-saving state which is as long as possible.

The communication device may have a clock generator device (clock device) which the communication device can use to put itself into an activated state or a deactivated state at alternate times. Such a clock device may be in the form of a "real time clock" device for an integrated circuit.

The communication device may have a reception device which is used to put the communication device into the first operating state for receiving time information when a received signal is at a level which exceeds a prescribable threshold value. The criterion which such a reception device, which may contain an RF transceiver, uses for changing to a reception mode for receiving time information may be that a received signal is at a minimum level, for example exceeds a "Received Signal Strength Indicator" (RSSI) threshold.

In addition, the communication device may involve the reception device being used to put the communication device in the first operating state for receiving time information when a received signal is at a data rate which differs from a reference data rate by less than a prescribable threshold value. The criterion used to decide whether or not the communication device changes to the activated state for receiving the time information may therefore be not only the intensity of a relevant signal but also an adjustable data rate or a plurality of adjustable data rates. This additional decision criterion allows a higher level of reliability for the decision regarding whether or not activation is to take place.

The communication device may have a logic device which is used to put the communication device into the first operating state for receiving time information when, on the basis of received addressing information, it is established that the communication device is addressed by a received signal.

On the basis of this refinement, the reception device can first of all ascertain whether there is actually a signal to be received, that is to say whether time information possibly needs to be detected. If this is the case then a signal can be detected by the logic device and from this signal the information can be taken regarding whether a time or useful information signal which may need to be evaluated is actually associated with the respective communication device. For this, it is possible to use an FPGA (Field Programmable Gate Array), that is to say an arrangement of programmable or configurable logic cells, which evaluates the address information picked up to determine whether it is intended to be used to address the communication device.

The reception device may be set up such that it transfers the communication device to the first operating state by changing the logic device from a deactivated state to an activated state.

The logic device may be set up such that upon establishing that the communication device is addressed by the received signal, it activates the reception device to receive the time information. In other words, the reception device can first of all establish whether there is possibly a signal relating to the communication device. If this is the case then the reception device activates the logic device, so that the logic device can ascertain whether or not the received signal is being used to address the particular communication device. If this is the case then the logic device activates the reception device, so that the reception device is put into a reception operating state for receiving time information.

Following ascertainment of the later time at which useful information will be ascertained, and before reception of the useful information, the reception device and/or the logic device may be in a deactivated state or can be deactivated.

On the basis of this refinement, power can be saved by putting the reception device and/or the logic device into a low-power state in a time interval which is between ascertainment of the time of the later transmission of useful information and the time of transmission of the useful information. In this time interval, the system can be certain that no useful signal will be transmitted which contains useful information for the communication device. The reception device and/or the logic device can therefore be turned off using the time information obtained previously, and needless consumption of power in such a waiting interval can be avoided.

The communication device may have a processor unit which is set up to process received useful information. Such a CPU (for example a microcontroller) can be supplied with and evaluate useful information picked up at the later time.

The processor unit may be set up such that it is activated only after reception of the useful information. Such a processor unit has the task of evaluating the received useful information. The functionality of the communication device is therefore not affected if the processor unit is not turned on until after the useful information has been received. It can therefore remain turned off in the previously executed process of ascertaining time information and checking whether particular information is intended for the particular communication device, which saves the power for supplying the processor unit.

In particular, the logic device may be set up such that it activates the processor unit only after reception of the useful information. On the basis of this refinement, the logic device sends the processor unit an activation signal when the useful information has been received correctly and the processor unit is needed to evaluate the received useful information.

The invention's communication device may be set up for wireless communication, that is to say without continuous electrical connection. On the basis of this refinement, the invention's communication device is therefore particularly suitable for being actuated by using electromagnetic waves (for example in the radio frequency range).

The invention's communication device may be set up as a radio frequency transceiver, particularly as an active radio frequency identification tag (RFID tag). An active RFID tag usually contains a battery, an antenna, a circuit for sending and receiving electromagnetic waves (transceiver) and a signal processing circuit. Such an RFID tag is therefore frequently constructed from a small silicon chip which is connected to an antenna mounted on a plastic support. An RFID tag allows data to be read and stored without contact. Such data can be stored on an RFID tag.

The invention's communication device may be set up such that individual components can be put into an activated state or into a deactivated state independently of one another. On the basis of this refinement, particularly low-power operation of the communication device is possible, since splitting the communication device into different functional groups respectively allows electrical power to be supplied just to a functional group which is actually currently required, whereas functional groups which are not currently required can be turned off. By way of example, the microcontroller can remain turned off while the time information is being ascertained, whereas the reception device and/or the logic device need(s) to be activated during this period. Splitting the communication device into different modules with a respective separate power supply allows the power needed to be minimized.

The text which follows describes embodiments of the inventive control device. These embodiments also apply to the communication device and to the communication system.

The control device may be set up such that the time information is split into at least two time information blocks which can be transmitted in succession, a respective one of the time information blocks being able to be taken as a basis for ascertaining the residual time which remains from the time at which the respective time information block is transmitted to transmission of the useful information. Splitting the time information into a plurality of time information blocks which are to be transmitted successively allows a conclusion to be drawn about the time at which useful information is transmitted even when, by way of example, just one of the plurality of time information blocks is detected during an activation state of the reception device. If this is the case then the reception device or the communication device can ascertain what time still remains until useful information is transmitted. Clearly, successive time information blocks can be used to effect a kind of countdown for the next transmission cycle for useful information.

A respective one of the time information blocks can be used to ascertain the position of this time information block within the time information blocks.

In particular, the control device may be set up such that a synchronization block can be transmitted before the time information and/or between successive time information blocks, the synchronization block being able to be taken as a basis for ascertaining that time information is transmitted after the synchronization block. This allows the data stream contained in the time information to be split into alternating data blocks of time information blocks and synchronization blocks. In addition, an addressing block can be transmitted before the time information and/or between successive time information blocks, the addressing block being taken as a basis for ascertaining that a particular communication device is addressed.

Using such addressing information, a communication device can ascertain whether a signal from a control device is being sent to it or possibly to another communication device. Such a refinement may be advantageous, by way of example, within the context of a "Smart House" environment, for example where a laptop computer as the control device simultaneously actuates a plurality of communication devices, for example a temperature controller, a switch and a pressure sensor.

By way of example, the control device may be set up as a desktop computer, as a laptop computer or as a personal digital assistant (PDA). Such a control device is frequently uncritical in terms of its power consumption, since there is little involvement for a user to supply electrical power to a central control device of this kind, whereas the frequent changing of batteries is involved and therefore inconvenience during use when there are a large number of communication devices.

The text which follows describes refinements of the communication system. These refinements also apply to the communication device and to the control apparatus.

The communication system may have a plurality of communication devices with the features described above. By way of example, a single control apparatus can control a plurality of communication devices centrally in such a scenario.

The communication system may be set up as a master-slave system in which the control apparatus is set up as a master and in which the at least one communication device is set up as a slave. Such a master-slave architecture is formed from a master, namely the control apparatus, and a plurality of slaves, namely the communication devices.

Alternatively, the control device and the at least one communication device may form a peer-to-peer system. In a peer-to-peer system, the individual entities have equal authority, that is to say that communication "among equals" takes place. The opposite of peer-to-peer communication is master-slave communication. Hence, the invention's communication system also allows a plurality of communication devices to interact with one another, at least one of the communication devices assuming the functionality of the inventive control device. By way of example, an appropriate control signal can be transmitted to all of the communication device's neighbors, in which case the sending entity forms the control apparatus and the destination entity forms the communication device in the communication system. The invention is therefore not limited to a hierarchic communication architecture.

In line with one embodiment of the communication system, the control apparatus is a household control apparatus and each of the at least one communication devices is a household appliance. The invention's communication system is therefore suitable for a "Smart House" environment, that is to say a household control system having one (or a plurality of) central control apparatus(es) for controlling a multiplicity of decentralized entities, namely a plurality of communication devices (temperature sensor, pressure sensor, switch etc.).

Figure 3:
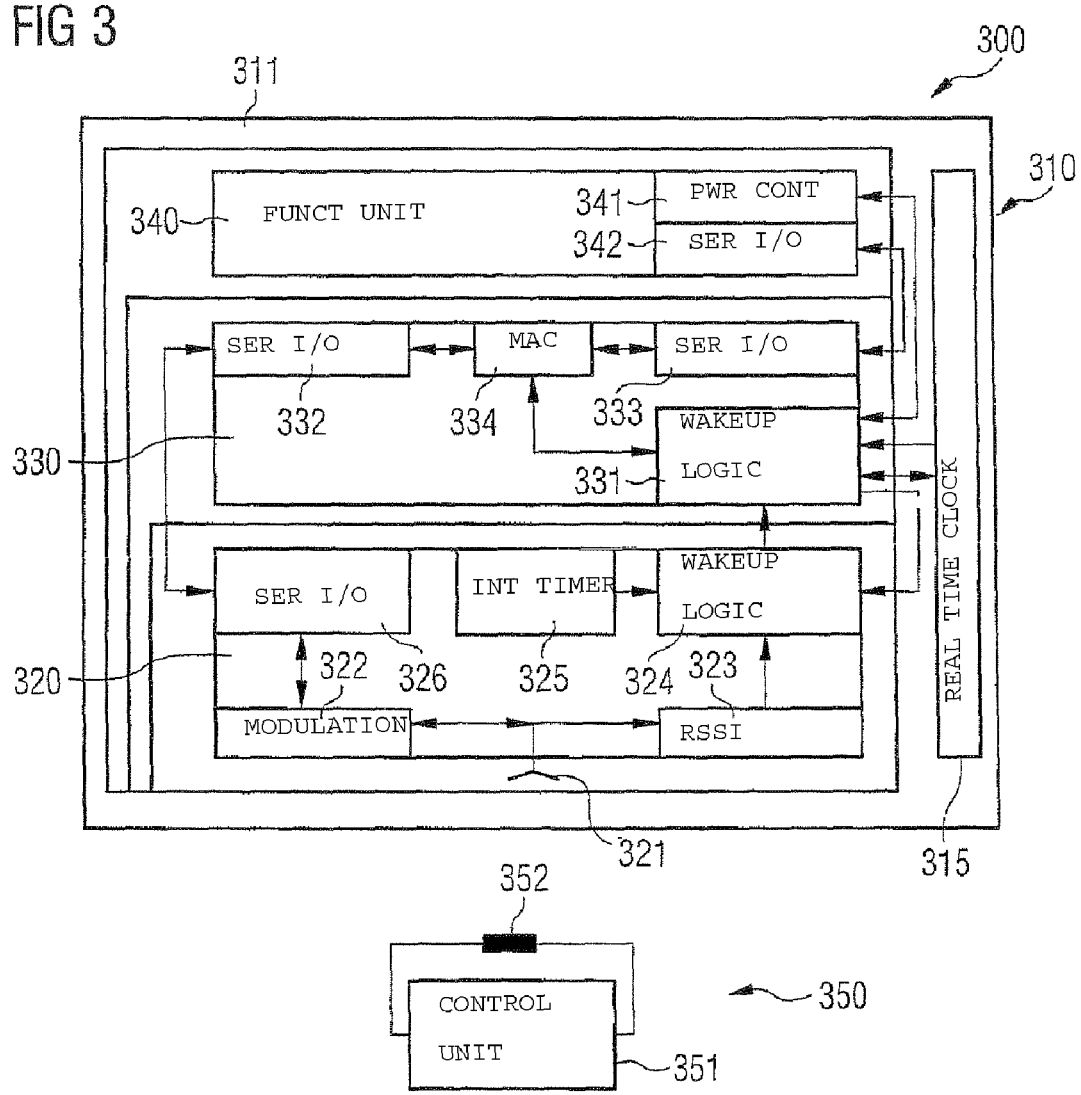
FIG. 3 illustrates a communication system based on one exemplary embodiment.

The text which follows refers to FIG. 3 to describe a communication system 300 based on an exemplary embodiment of the invention.

The communication system 300 is formed from a communication device 310 and from a control device 350.

As described in more detail below, the control device 350 is set up such that it can transmit time information and useful information to the communication device 310 at alternate times, the time information being able to be taken as a basis by the communication device 310 for ascertaining the later time at which useful information will be transmitted next. The control device 350 is formed from a control unit 351 and a transmission antenna 352 coupled thereto. The control unit 351 is used to form the signals which are to be emitted by the transmission antenna 352, these being able to be emitted in the form of a radio frequency signal. This signal can be used to control the communication device 310.

The communication device 310 contains an integrated circuit which is formed on a plastic support 311. This integrated circuit is coupled to an antenna 321 which can be used for reciprocal interchange of electromagnetic radiation with the control device's antenna 352. The plastic support 311 can be mounted on an entity which is to be controlled or can be electrically coupled thereto. By way of example, the entity to be controlled may be a temperature sensor which can be actuated and read by the control device 350. The control device 350 can therefore both control the functionality of the temperature sensor and read signals from the temperature sensor.

The communication protocol which the control device 350 and the communication device 310 use for communication is based on the actual transmission of useful information for controlling and reading the communication device 310 being preceded by the control device 350 sending the communication device 310 time information which the communication device 310 can detect and which reveals what residual time remains up until transmission of the next data signal block. In this way, the communication device 310 can prepare itself for the later time at which useful signals are transmitted, this being particularly advantageous for planning the power requirement and implementing a particularly low-power mode of operation for the communication device 310. This is because in periods in which the transmitted time information means that transmission of useful information is not to be expected, the communication device 310 can turn off such modules which are not currently required. This allows a reduction in the power requirement for the communication device 310.

The communication device 310 essentially has four functional blocks, which are described in more detail below. A "real time clock" functional unit 315 produces a real time clock which accomplishes time-controlled activation of the communication device 310.

In addition, an RF transceiver functional unit 320 is provided, having an antenna 321 which can receive electromagnetic radiation from the transmission antenna 352 and can transmit electromagnetic radiation (to the transmission antenna 352). In addition, the RF transceiver functional unit 320 contains a modulation unit 322, an RSSI unit 323 (Received Signal Strength Indicator), a wakeup logic unit 324, an internal time unit 325 and a serial I/O unit 326.

In addition, an FPGA functional unit 330 is provided which has a wakeup logic unit 331, a first serial I/O unit 332, a second serial I/O unit 333 and a MAC unit 334 (Media Access Control).

A microcontroller functional unit 340 contains a power control unit 341 and a serial I/O unit 342.

The modulation unit 322 is coupled to the RSSI unit 323, to the antenna 321 and to the serial I/O unit 326. In addition, the RSSI unit 323 is coupled to the wakeup logic 324, to the internal timer unit 325 and to the modulation unit 322. The wakeup logic 324 is coupled to the wakeup logic unit 331. In addition, the wakeup logic unit 331 is coupled to the real time clock functional unit 315. The wakeup logic unit 331 is coupled to the MAC unit 334. In addition, the MAC unit 334 is coupled to the first serial I/O unit 332, which is coupled to the serial I/O unit 326. Furthermore, the MAC unit 334 is coupled to the second serial I/O unit 333. The second serial I/O unit 333 is coupled to the serial I/O unit 342. The power controller 341 is coupled to the wakeup logic unit 331.

The communication device 310 contains three power groups, namely a power domain 1, which represents the power circulation within the RF transceiver functional unit 320, a power domain 2, which represents the power supply within the FPGA functional unit 330, and a power domain 3, which represents the power supply within the microcontroller functional unit 340.

Hence, FIG. 3 illustrates the hardware architecture for the invention based on an exemplary embodiment of the inventive communication system 300.

For the WUP/WUF scheme, the hardware configuration illustrated in FIG. 3 is a suitable platform and contains four functional units within the communication device 310, namely the RF transceiver 320, the FPGA 330, the microcontroller 340 and the real time clock (RTC) 315.

The RF transceiver 320 has an internal timer 325 which the RF transceiver 320 uses to wake itself up periodically in order to scan a channel of signals. This mode of operation is called a self-polling mode (self-tuning mode). When the channel is scanned, a WUP/WUF signal is detected when the RSSI exceeds a programmable threshold value, which can be established using the RSSI unit 323. In addition, a WUP/WUF is detected only if the demodulated data rate matches the specific data rate which is used for the WUP/WUF. This data rate detection (DRD), which can be terminated within a very short time interval (3-bit interval), can significantly improve the efficiency of the system power. If only the RSSI criterion is used as a scanning criterion, normal data frames, large noise signals or signals from other systems which use the same frequency band can, under unfavorable circumstances, likewise waken the apparatus in unwanted fashion.

As FIG. 3 illustrates, the communication device is split into three power domains. First, the RF transceiver 320 scans the channel itself in self-polling mode; then, if a valid data rate is detected, the FPGA 330 is awakened to receive the data frame; if the data frame is then identified as addressing this communication device 310, the microcontroller 340 is awakened to process the frame. This power domain scheme involves different components being awakened only when needed, which maximizes the system's power efficiency.

An RTC functional unit 315 activated without interruption is very advantageous for a communication device 310 which is used in a wireless sensor network for various purposes.

The text below refers to FIG. 4 and FIG. 5 to describe a WakeUp Frame scheme 400 which has been significantly improved over the WakeUp Preamble scheme 100 known from the prior art.

The WakeUp Frame scheme 400 illustrates the timing for signal and operating states on various components of the communication device 310.

A transmitter scheme 410 illustrates the signalling for radio frequency signals which are sent from the control unit 350 to the communication device 310. The data sent form a WakeUp Frame 414, which typically has a duration of approximately 500 ms. First of all, synchronization blocks 411 and time information blocks 412 are sent alternately, each of the time information blocks 412 having its own character reading (n, n−1, n−2, ..., 1), so that the respective residual time up until transmission of a data frame 413, that is to say useful data, can be taken from any of the time information blocks 412. Two time information blocks 412 are respectively separated from one another by a synchronization signal 411.

In addition, a receiver scheme 420, that is to say a timing for the operating state of the RF transceiver functional unit 320, is illustrated. As the receiver scheme 420 illustrates, the RF transceiver functional unit 320 can be operated in a deactivated state 421 or in an activated state 422. In a central range of the WakeUp Frame 414, the RF transceiver functional unit 320 may be in an RF sleep state 423.

Figure 4:
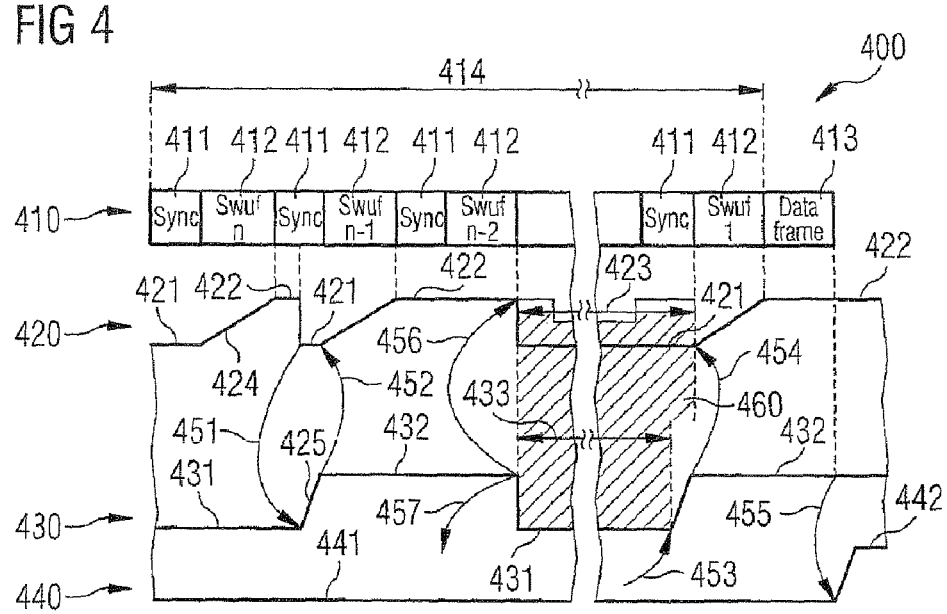
FIG. 4 illustrates a WakeUp Frame scheme based on one exemplary embodiment.
Figure 5:
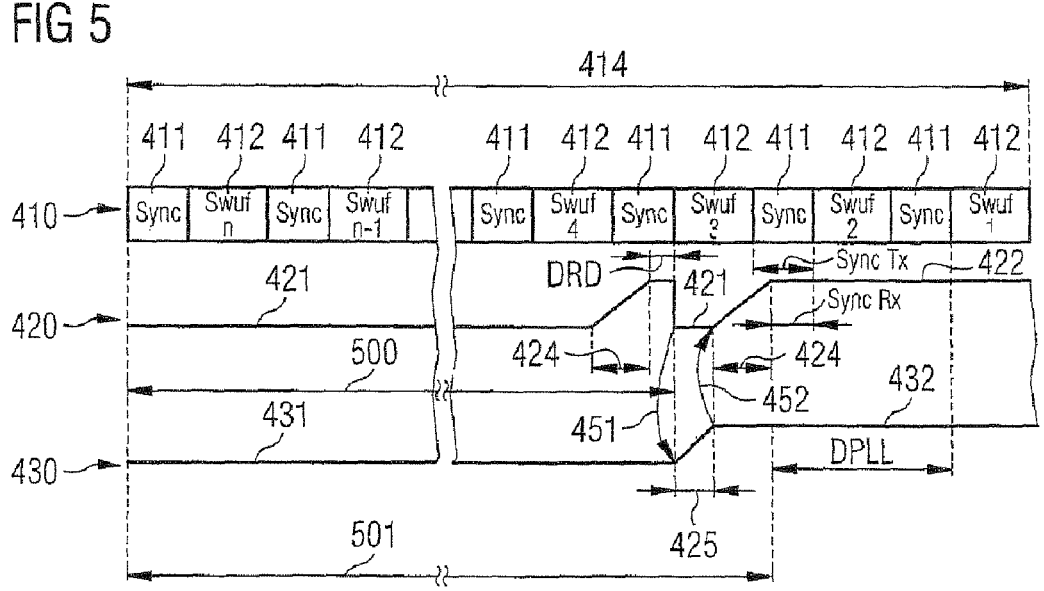
FIG. 5 illustrates another illustration of the WakeUp Frame scheme based on one exemplary embodiment which is illustrated in FIG. 4.

In addition, FIG. 4 illustrates an FPGA scheme 430 which illustrates the timing for the operating states of the FPGA functional unit 330. The FPGA functional unit 330 may be in a deactivated state 431 or in an activated state 432. In a central range of the WakeUp Frame 414, the FPGA functional unit 330 may be in an FPGA sleep state 433.

A microcontroller scheme 440 illustrates different operating states for the microcontroller functional unit 340. This may be in a deactivated state 441 or in an activated state 442.

In this context, "activated state" is understood to mean that the respective functional unit in this operating state is consuming electrical power (which is provided by a battery, for example), whereas "deactivated state" means that the respective functional unit in this operating state is consuming essentially no power.

The text below describes the WakeUp Frame scheme 400 in more detail.

The WakeUp Frame scheme 400 has been improved over the communication schemes for communication between a communication unit and a control device which are known from the prior art. In line with the WakeUp Frame scheme 400, a useful data block is preceded by the transmission of a WUF 414 (WakeUp Frame) instead of a WUP (WakeUp Preamble). The WUF 414 contains a plurality of short WUFs or WUF ranges (Short WakeUp Frame, SWUF) 411 and 412. Each SWUF 411 and 412 is a complete MAC frame and contains a synchronization field 411 and a frame body 412, just like a normal data frame. However, an SWUF 411 and 412 of this kind is transmitted using a specific data rate which is different from the one used for the data frame. A DRD group therefore remains quiet when a data frame arrives, which means that the probability of an unnecessary wakeup is reduced.

The frame body of each SWUF 411 and 412 contains an MAC header having a destination MAC address. Apart from this, there is a separate field which indicates the position of the current SWUF 411 and 412 in the whole WUF 414, as illustrated by the number in the frame bodies in FIG. 4 (SWUF n, SWUF n−1, SWUF n−2, ..., SWUF 1). If a transceiver 320 detects a correct data rate, for example at the (n−1)th SWUF 411 and 412 (successful detection does not necessarily have to occur in the synchronization field and may also occur in the frame body), the FPGA 330 is awoken by a wakeup command 451. Consequently, the FPGA 330 wakens the RF transceiver 320 with a wakeup command 452 and accordingly puts the RF transceiver 420 into the reception mode. If the FPGA 320 receives a complete SWUF 411 and 412 with a correct CRC checksum (cyclic redundancy check), for example (n−2)th SWUF 411 and 412, the destination MAC address is checked. If the WUF 414 is not addressed to this transceiver, that is to say if the WUF 414 is used to address not the communication device 310 but rather any other communication device which a reading apparatus wishes to contact, the FPGA 330 switches the transceiver 320 back to the self-polling mode and immediately turns itself off. In other words, the transceiver 320 then changes to an operating state in which it is periodically activated and deactivated, and during the activated state it scans a channel for signals and otherwise, in a deactivated state, is disconnected from the supply of power and behaves passively. If the WUF 414 is addressed to this communication device 310, however, the FPGA 330 can tell from the position field that (n−3) SWUF 411 and 412 up to the data frame 413 are still missing. Since the FPGA 330 also contains the length and the data rate of the SWUF 411 and 412, the residual time that remains up until the end of the transmission of the whole WUF 414 can be calculated. This time can be referred to as x (for example in milliseconds). In addition, the RF setup time 424 and the FPGA setup time 425 can be subtracted from x in order to determine a value y. If y>0, the FPGA 330 uses a turn-off command 456 to switch the RF transceiver 320 to an RF sleep state 423, uses a set-RTC command 457 to set the RTC and turns itself off in order to change to an FPGA sleep state 433. The RTC 315 will waken the FPGA 330 at a time which is determined by the FPGA 330, and then the FPGA 330 wakens the RF transceiver 320 using a wakeup command 454, in order to receive the following data frame 413. If the data frame 413 contains no errors and is sent to this transceiver 310, the microcontroller is awoken by a wakeup command 456 in order to process the received data. This WUF scheme 414 avoids the unnecessary waiting time in the conventional WUP scheme, which saves power in a power saving range 460, so that particularly low-power operation for communication device 310 is made possible.

Apart from this, the number of SWUFs 411 and 412 in a WUF 414 should be calculated carefully by the transmitter 350. FIG. 5 illustrates another view of the WakeUp Frame scheme 400 in a worst case scenario. This worst case scenario describes the case in which the RF receiver 320 just misses the RF scanning interval 421 provided at the start of the WUF 414. The minimum length of the WUF 414 should then contain a scanning period 500 and the FPGA setup time 425 and the RF transceiver setup time 424. In addition, after both the FPGA 330 and the RF transceiver 320 have awoken, it should be certain that a complete SWUF 411 and 412 has been received. In the worst case scenario, in which the start of a synchronization field has just been missed by an SWUF 411 and 412, so that the digital phase locked loop (D.PLL) in the receiver 320 cannot be synchronized to the rest of a synchronization field, an additional SWUF 411 and 412 should be added, as illustrated in FIG. 5. Accordingly, all worst case scenarios should be taken into account when calculating the number of SWUFs 411+412 in a WUF 414, in order to ensure that a complete SWUF 411 and 412 can be received after the FPGA 330 and the RF transceiver 320 have awoken.

The invention's WUF scheme 400 is an optimized-power version of a WUP scheme. In comparison with the traditional WUP scheme, the invention's WUF scheme can save a very large amount of power for every transmitted data frame preceded by a WUP by eliminating unnecessary waiting time. This means that the invention's WUF scheme is all the more efficient, in comparison with the WUP scheme, the more frames are sent. However, the preamble scanning scheme is designed above all for a network with sporadic traffic, since long preambles reduce the channel capacity. The invention's approach uses a WUF instead of a WUP, but because the lengths are essentially the same, the WUF scheme is likewise particularly well suited to processing sporadic traffic. However, the WUF scheme can also be applied in a scenario in which the traffic loading that occurs is low. This has been illustrated by simulations, which have revealed that significant improvements can be achieved with the WUF scheme even for little traffic.

In a master-slave scenario, the power limitation of the master (that is to say the terminal) is low, which means that longer scanning periods can be used, for example 500 ms, in order to save more active time and hence power in the limited-power slaves (transceivers). Consequently, the WUF scheme can achieve a very significant power gain in comparison with the WUP scheme, even under a low traffic load, particularly when packet collisions occur.

As mentioned previously, both the WUP scheme and the WUF scheme are not limited to a master-slave topology. The WUF scheme can also be used in peer-to-peer communication without a master. In this case, as any limited-power transceiver also needs to transmit the long WUF and therefore consumes power, a shorter scanning period is chosen in order to achieve optimized power consumption under particular traffic loads, for example 200 ms.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. A communication device configured to selectively enter one of an activated state and a deactivated state comprising:
    a reception device for detecting a signal; and
    a plurality of components configured for selective activation;
    wherein the communication device, while in the deactivated state, performs periodic self-polling using the reception device, and the communication device directly enters the activated state based upon the results of the periodic self-polling;
    wherein the communication device, while in the activated state selectively activates a first set of components, consisting of one or more of the plurality of components, to receive time information associated with the transmission of useful information to the communication device;
    wherein the communication device selectively deactivates one or more of the plurality of components for a period of time based upon the time information received after which the communication device selectively activates a second set of components prior to the transmission of the useful information to the communication device; and
    wherein the second set of components consists of one or more components not within the first set of components.

2. The communication device of claim 1, configured to automatically enter the activated state and the deactivated state periodically.

3. The communication device of claim 1, comprising a clock generator device, where the communication device uses the clock generator to perform the periodic self-polling.

4. The communication device of claim 1 wherein the reception device triggers the communication device to enter the activated state for receiving time information, when a signal received by the reception device is at a level which exceeds a predetermined threshold value.

5. The communication device of claim 4, wherein the reception device is configured to trigger the communication device to enter the activated state for receiving time information when a received signal is at a data rate which differs from at least one reference data rate by less than a predetermined threshold value.

6. The communication device of claim 4, configured such that following ascertainment of the later time at which useful information is transmitted and before reception of the useful information, the communication device deactivates the reception device or the logic device.

7. The communication device of claim 1, comprising:
    a logic device configured to trigger the communication device to enter the activated state for receiving time information when, on the basis of received addressing information, it is established that the communication device is addressed by a received signal.

8. The communication device of claim 7, wherein the reception device is configured to trigger the communication device to enter the activated state by changing the logic device from a first state to a second state.

9. The communication device of claim 7, wherein the logic device is configured such that upon establishing that the communication device is addressed by the received signal, the logic device activates the reception device to receive the time information.

10. The communication device of claim 1, comprising:
    a processor unit configured to process received useful information.

11. The communication device of claim 10, wherein the processor unit is configured such that it is activated only after reception of the useful information.

12. The communication device of claim 11, wherein the logic device is configured such that it activates the processor unit only after reception of the useful information.

13. The communication device of claim 1, configured for wireless communication.

14. The communication device of claim 1, configured as a radio frequency transceiver.

15. The communication device of claim 1, configured as a radio frequency identification tag.

16. A communication system comprising:
    a communication device comprising:
        a reception device for detecting a signal; and
        a plurality of components configured for selective activation; and
    a control apparatus for communication with the at least one communication device configured to transmit time information and useful information to the communication device at alternate times, the time information being able to be taken as a basis for ascertaining the later time at which useful information is transmitted;
    wherein the communication device, while in the deactivated state, performs periodic self-polling using the reception device, and the communication device directly enters the activated state based upon the results of the periodic self-polling;
    wherein the communication device, while in the activated state selectively activates a first set of components, consisting of one or more of the plurality of components, to receive time information associated with the transmission of useful information to the communication device;

wherein the communication device selectively deactivates one or more of the plurality of components for a period of time based upon the time information received after which the communication device selectively activates a second set of components prior to the transmission of the useful information to the communication device; and wherein the second set of components consists of one or more components not within the first set of components.

17. The communication system of claim 16, wherein the control device is configured such that the time information is split into at least two time information blocks which can be transmitted in succession, a respective one of the time information blocks being able to be taken as a basis for ascertaining the residual time which remains from the time at which the respective time information block is transmitted to transmission of the useful information.

18. The communication system of claim 17, wherein the control device is configured such that a respective one of the time information blocks can be used to ascertain the position of this time information block within the time information blocks.

19. The communication system of claim 16, comprising where the control device is set up such that a synchronization block can be transmitted before the time information or between successive time information blocks, the synchronization block being able to be taken as a basis for ascertaining that time information is transmitted after the synchronization block.

20. The communication system of claim 16, comprising where the control device is set up such that an addressing block can be transmitted before the time information or between successive time information blocks, the addressing block being able to be taken as a basis for ascertaining that a particular communication device is addressed.

21. The communication system of claim 16, comprising where the control device is configured as
- a desktop computer;
- a laptop computer; or
- a personal digital assistant.

22. The communication system of claim 16, having a plurality of communication devices.

23. The communication system of claim 16, configured as a master-slave system, in which the control apparatus is set up as a master and in which the at least one communication device is set up as a slave.

24. The communication system of claim 16, in which the control apparatus and the at least one communication device form a peer-to-peer system.

25. The communication system of claim 16, comprising where the control apparatus is a household control apparatus and in which each of the at least one communication devices is a household appliance.

* * * * *